Patented Feb. 25, 1930

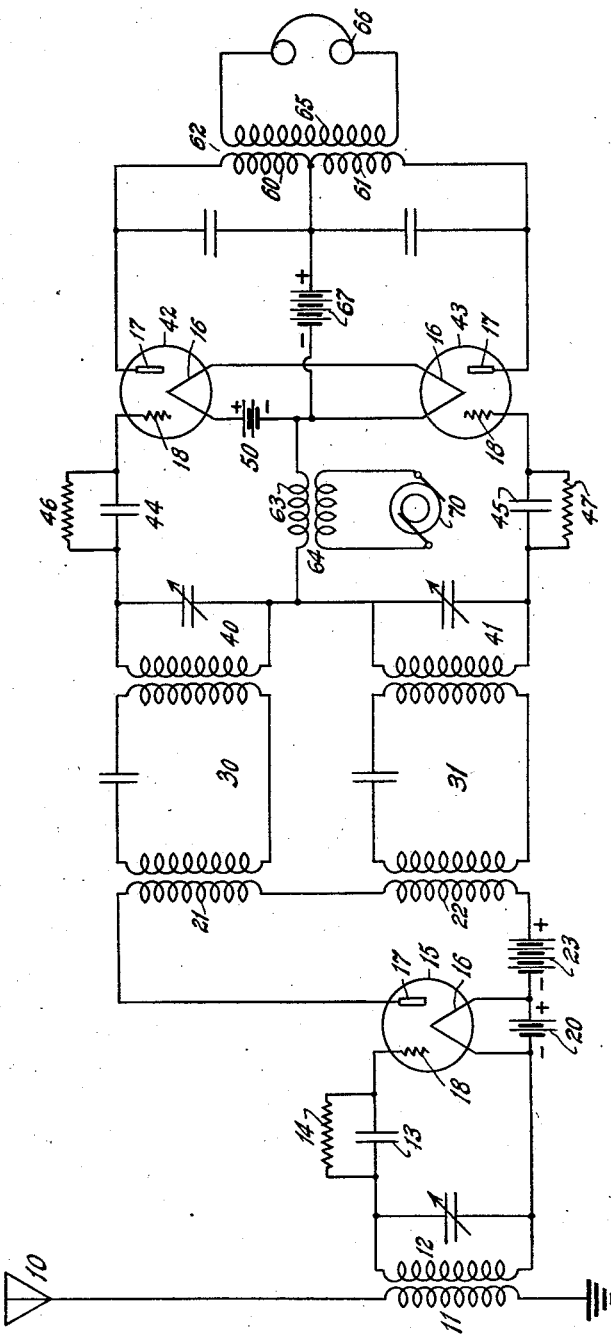

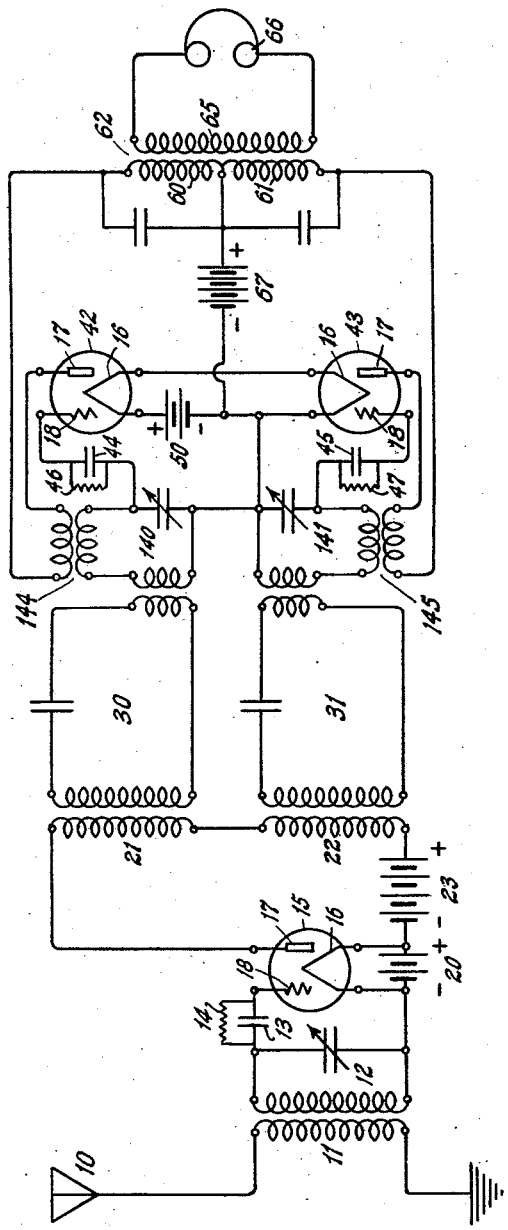

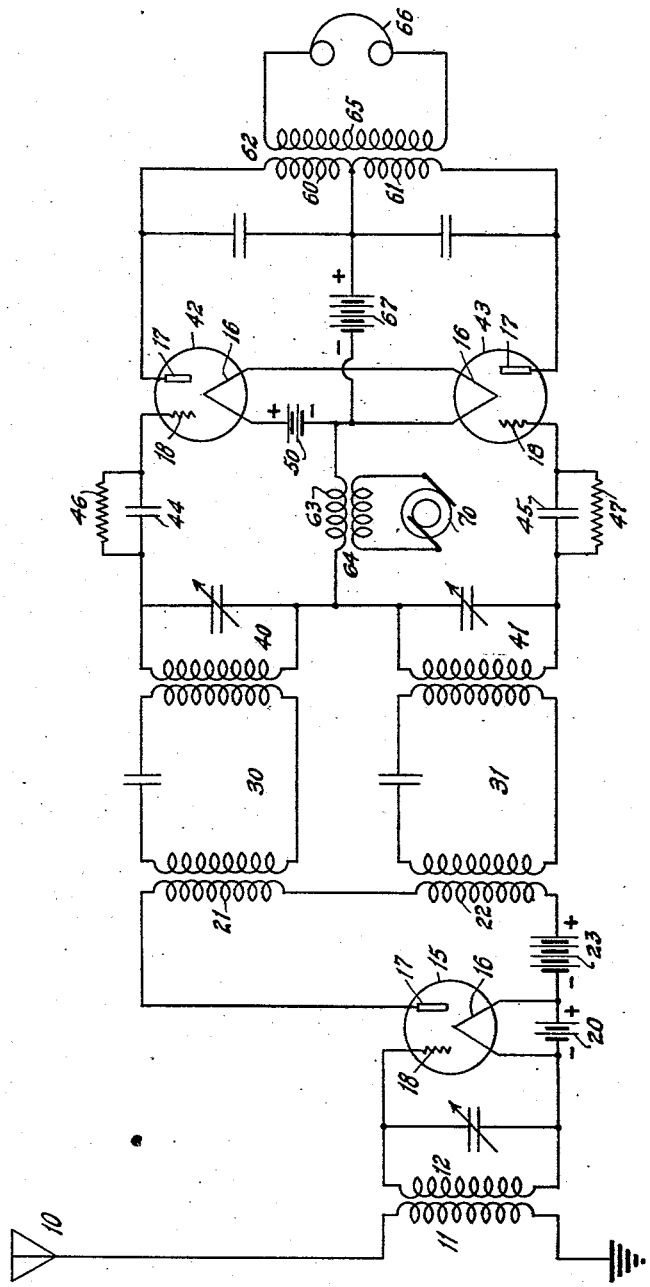

1,748,277

UNITED STATES PATENT OFFICE

EMORY LEON CHAFFEE, OF BELMONT, MASSACHUSETTS, ASSIGNOR TO JOHN HAYS HAMMOND, JR.

RADIANT SIGNALING SYSTEM

Application filed September 11, 1922. Serial No. 587,262.

This invention relates to systems for the communication of intelligence, and more particularly to transmitting signals by radiant energy or so-called Hertzian waves.

In the practice of the art of radio signaling, it has been found heretofore that static or other stray disturbances in the atmosphere produce indications which may interfere or be confused with the desired signals.

Broadly stated, it is an object of the present invention to provide an improved method and means for receiving radiant energy so that desired signals may be received independently of such static or atmospheric strays, the effects of the static and strays being substantially neutralized.

Other objects will appear from the following description taken in connection with the accompanying drawings, in which Figure 1 is a diagram of one form and Figures 2 and 3 of modified forms of a receiving system embodying the features of the invention.

The system of the present invention employs a carrier wave of suitable radio frequency, and the transmitting station may be of either of two forms. In one form the carrier wave is interrupted or otherwise modulated to form signals, and in the other the carrier wave is modulated by a lower frequency upon which the signal modulations are impressed. In a general way the receiving station comprises means for receiving the carrier waves selectively, and provides a resonant channel for transmitting signaling currents to an indicating device. The receiving station also includes a second resonant channel, somewhat differently tuned, over which static or other strays are transmitted to the indicating device so as to balance or neutralize the effects on the indicating device of such disturbances passing through the signal resonant circuit.

Referring to the form of receiving station shown diagrammatically in Figure 1, which is intended to operate with a transmitting station of the second form described above, there is provided a suitable receiving element positioned so as to intercept radio oscillations or so-called Hertzian waves. A carrier wave frequency of for example, 1,000,000 cycles per second may be employed. As shown, this receiving element comprises an antenna 10, the circuit of which includes an inductance 11 coupled to a usual closed, oscillatory circuit 12. The oscillatory circuit 12 is cooperatively connected through a suitable grid condenser 13 and grid leak 14 with the input circuit of a thermionic device 15 having a usual filament 16 for emitting electrons, a plate 17 upon which the electrons impinge, and a grid 18 for controlling the passage of electrons.

The filament 16 of the thermionic device 15 may be heated by a current supplied by a battery 20. The output circuit includes two inductances 21 and 22 in series; and also includes a source of direct current 23 for maintaining a positive potential upon the plate 17 of the device 15 relative to its filament 16.

The inductance 21 is coupled to a signal resonant or filter circuit 30 tuned to respond only to the modulating frequency used at the sending station. The circuit 30 may comprise a suitable combination of inductance and capacity to permit the passage of currents of desired frequency and to suppress currents of all other frequencies. Similarly, the inductance 22 is coupled to a balancing resonant or filter circuit 31 tuned to a frequency differing from that of the modulating frequency by a relatively small amount, say by 2,000 cycles. For example, if the modulating wave employed is 20,000 cycles per second, then circuit 30 might be arranged to pass currents of this frequency, and circuit 31 to pass currents having a frequency of 18,000 or 22,000 cycles per second.

The filter circuits 30 and 31 are coupled to a corresponding pair of closed oscillatory circuits 40 and 41 each tuned to respond to the frequency passed by the respective filter circuit. The closed, oscillatory circuit 40 is connected with the input of a thermionic device 42, and the oscillatory circuit 41 is similarly connected with the input of a thermionic device 43, each of said devices having the usual filament 16, plate 17 and grid 18, the connections including grid condensers 44 and 45 and suitable grid leaks 46 and 47 respectively.

The filaments 16 of the thermionic devices 42 and 43 may be heated by a current supplied by a battery 50. The respective output circuits include windings 60 and 61 of a transformer 62. The transformer 62 is provided with a third winding 65 connected in series with an indicating device such as a telephone receiver 66. The united ends of the windings 60 and 61 are connected with the positive pole of a source of direct current 67 for maintaining the plates 17 of the thermionic devices 42 and 43 at a positive potential relative to the filaments 16.

For supplying an oscillatory electro-motive force of a frequency differing by the same amount from each of the frequencies passed by the filter circuits 30 and 31 there is provided a transformer 64 having a secondary winding 63 connected to the inputs of the thermionic devices 42 and 43 and a suitable source of alternating electro-motive force such as an alternator 70 connected to the primary winding of the transformer 64.

In the operation of the receiving station of Figure 1, the sending station from which messages are to be received, emits radiant energy modulated by a current of, for example, 20,000 cycles per second and itself modulated by speech or other signals. The energy is intercepted by the receiving element 10 of the receiving station, and there is set up in the oscillatory circuit 12 currents of the carrier frequency employed. There appears in the output circuit of the thermionic device 15 unidirectional impulses of the modulating frequency, i. e., 20,000 cycles in the present example.

Because the resonant circuit 31 is tuned to suppress currents of this frequency, its associated oscillatory circuit 41 remains unresponsive. The currents of 20,000 cycles, however, are transmitted by the resonant circuit 30 to its oscillatory circuit 40. The heterodyne 70, the frequency of which differs somewhat from the frequency of the current passed by the resonant circuit 30, varies the potential of the grid of the thermionic device 42, and causes beat current of the difference frequency to be produced in the output circuit of the device. This beat current is induced in the winding 65 of the transformer 62. In the case cited by way of example the source 70 might be arranged to produce oscillations of 19,000 or 21,000 cycles per second, and since the frequency of the currents passed by the resonant or filter circuit 30 is 20,000 cycles per second, the rectified beat current would have a frequency of 1,000 cycles per second. The beat current would actuate the indicating device 66.

It will be seen that in the conditions described, the winding 61 of the transformer 62 is inactive. When, however, static or atmospheric stray disturbances affect the receiving element 10, the shock causes the oscillatory circuit 12 to oscillate with a modulation which is resolvable into a band of frequencies. This band of frequencies includes the natural frequencies to which the resonant circuits 30 and 31 are tuned and will cause both circuits 30 and 31 and their associated circuits 40 and 41 to oscillate at their natural frequencies with substantially the same amplitude. Circuits 40 and 41 respond to these frequencies and the potentials produced therein when added to the electromotive force produced in the secondary winding 63 by the heterodyne 70 produce beat currents of 1,000 cycles per second in the inputs of the thermionic devices 42 and 43. These are rectified by said devices and there are produced superimposed currents of similar nature in both windings 60 and 61 of the transformer 62. The connections of the windings 60 and 61 are such that they produce opposite effects in the winding 65, and these effects are neutralized or balanced. Thus the indicating device 66 is not affected by these disturbances, and substantially no interference with the true message is caused.

In the modified form of receiving station shown diagrammatically in Figure 2, there is provided, as in Figure 1, a receiving element 10, oscillatory circuit 12, thermionic device 15 and resonant circuits 30 and 31. The circuits 30 and 31 are coupled to closed, oscillatory circuits 140 and 141. The circuit 140 is connected to the input circuit of a thermionic device 42, and the circuit 141 to that of a similar device 43, as in Figure 1. The output circuits include respective windings of feed back transformers 144 and 145, and windings 60 and 61 of a transformer 62, there being included in a common path for both output circuits a source of direct current 67 for maintaining the plates 17 at a positive potential relative to the respective filaments. The transformers 144 and 145 acting as tickler coils cause the energy of the plate circuit to react upon the grid circuit so as to cause the devices 42 and 43 to oscillate regeneratively, and thus to act as autodynes. The frequency of such regenerative oscillations depends upon the electrical characteristics of the output and input circuits, and preferably differs by the same amount from each of the frequencies passed by the filter circuits 30 and 31. Thus these autodynes replace the heterodyne of Figure 1.

The operation of the receiving station of Figure 2 is similar to that of Figure 1, except that the beat currents are produced by the autodyne arrangements described, instead of by a heterodyne. As described above, if the beat currents result from the reception of energy emitted by the sending station, they will actuate the indicating device 66; but if they result from the shock of atmospheric disturbances, they will balance out in their effects, and the indicating device 66 will not be actuated.

The receiving station of Figure 1 may be used for telephonic communication by omitting the heterodyne 70 and short circuiting the secondary winding 63 of the transformer 64.

In the operation of such a receiving station for telephony, the sending station emits energy having the form of high frequency oscillations periodically modulated by a series of waves of a lower frequency, for example, 20,000 cycles. The last named series of waves is modulated by a speech current in a well known manner. The energy is received as before by the antenna 10 and the periodic amplitude variations cause the circuit 30 to resonate, but not circuit 31. The current thereby produced in the closed, oscillatory circuit 40 is rectified or otherwise detected by the device 42, and there is produced in the circuit of the telephone receiver a fluctuating current having the characteristics of the speech current at the sending station. The sound is thus reproduced at the receiving station.

As before, the indicating device is substantially unresponsive to the effects of "static" or other atmospheric strays. Such disturbances cause the closed, oscillatory circuit 12 to oscillate, the current therein having an envelope which is resolvable into a band of frequencies, including the frequencies to which the circuits 30 and 31 are tuned. The thermionic devices 42 and 43 acting as detectors produce currents in their output circuits corresponding to the envelope, and substantially equal in amplitude. These output currents are balanced out or neutralized as before, there being substantially no current produced in the indicating device 66, substantially no effect produced therein.

The receiving station of Figure 2 will operate for telephonic communication in a similar manner, the thermionic devices then being used as regenerative amplifiers for more efficiently reproducing the speech currents.

Referring now to Figure 3 which shows diagrammatically a receiving station adapted to co-operate with the first mentioned type of sending station, this embodiment receives radiant energy having the form of high frequency waves interrupted in accordance with a message or signal. It will be seen that Figure 3 corresponds to Figure 1 except that the grid condenser 13 and grid leak 14 of Figure 1 are omitted. Thus the thermionic device 15 operates as an amplifier of the received energy. The resonant or filter circuit 30 is tuned to the frequency of the radiated wave employed, for example, 50,000 cycles per second, and the balancing circuit 31 may then be tuned to 48,000 or 52,000 cycles per second.

The heterodyne 70 is then caused to produce oscillations having a frequency of 49,000 or 51,000 cycles per second, and when the sending station emits energy beat currents of 1,000 cycles per second are produced in the circuit of the indicating device 66. Interruption of the emitted energy in accordance with the signal causes corresponding interruption of this beat current.

With Figure 3 the effects of "static" or atmospheric strays are minimized as before, the filter circuits allowing currents of like amplitude and envelope to pass to the balanced windings 60 and 61.

Thus it will be seen that I have provided a system substantially free from the effects of atmospheric strays, so that messages may be reliably received under abnormal atmospheric conditions.

The invention upon which this application is based is broader than the specific embodiments shown and described for the purpose of illustration. It is understood, therefore, that its scope is not to be limited thereby, reference being had to the appended claims for that purpose.

What is claimed is:—

1. Apparatus for receiving the energy of a modulated wave, comprising a receiving element, a resonant channel cooperating therewith to transmit only currents of a predetermined frequency, a second resonant channel cooperating with the receiving element to transmit only currents of a different frequency, means for impressing upon the outputs of said channels an oscillatory electromotive force having a frequency differing by the same amount from each of said frequencies, and an indicating device responsive to the beats produced by one of the first named frequencies with the last named frequency but substantially unresponsive to beats produced by both of the first named frequencies therewith.

2. Apparatus for receiving the energy of a modulated wave, comprising a receiving element, a filter circuit cooperating therewith to transmit only currents of a predetermined frequency, a second filter circuit cooperating with the receiving element to transmit only currents of a different frequency, detectors connected with the output sides of the filter circuits respectively, means for impressing upon the input sides of the detectors an oscillatory electromotive force having a frequency differing by substantially the same amount from each of said frequencies, and an indicating device responsive to the beats produced by one of the first-named frequencies with the last-named frequency but substantially unresponsive to beats produced by both of the first-named frequencies therewith.

3. A receiving station for signals, comprising a receiving element positioned to intercept Hertzian waves, a pair of channels connected to said element and tuned to respond to different frequencies respectively, detectors connected to said channels respectively and arranged in a push-pull circuit, means for impressing on the inputs of said detectors an oscillatory electromotive force having a frequency differing by the same amount from each of said frequencies, and an indicating device responsive to the beats produced by one of the first-named frequencies with the last-named frequency but substantially unresponsive to beats produced by both of the first-named frequencies therewith.

4. A receiving station for signals, comprising a receiving element positioned to intercept high frequency waves, means for producing current of lower frequency from said waves, a pair of electrical filters tuned to respond to the frequency of said current and to a different frequency respectively, means for impressing on the outputs of said filters an oscillatory electromotive force having a frequency differing by the same amount from each of said frequencies, and an indicating device responsive to the beats produced by one of the first-named frequencies with the last-named frequency but substantially unresponsive to beats produced by both of the first-named frequencies therewith.

5. Apparatus for receiving energy having the form of high frequency waves periodically modulated by variations of lower frequency, comprising a receiving element tuned to the frequency of said waves, a detector for producing current of said lower frequency from said waves, a resonant channel tuned to the frequency of said current, a second resonant channel tuned to a different frequency, means for producing in the outputs of said channels an oscillatory electromotive force having a frequency differing by the same amount from each of said frequencies, and an indicating device responsive to the beats produced by one of the first-named frequencies with the last-named frequency but substantially unresponsive to beats produced by both of the first-named frequencies therewith.

6. Apparatus for receiving energy having the form of high frequency waves periodically modulated by variations of lower frequency, comprising a receiving element tuned to the frequency of said waves, a detector for producing current of said lower frequency from said waves, an electrical filter tuned to the frequency of said current, a second electrical filter tuned to a different frequency, both of said filters being connected with the output side of said detector, detectors connected with the output sides of said filters respectively, means for impressing upon the inputs of said detectors oscillatory current having a frequency differing by the same amount from each of said frequencies, and an indicating device responsive to the beats produced by one of the first-named frequencies with the last-named frequency but substantially unresponsive to beats produced by both of the first-named frequencies therewith.

7. A receiving station for Hertzian waves, comprising an element exposed to etheric disturbances, a pair of resonant circuits cooperating therewith to transmit currents of different frequencies respectively, means for impressing on the outputs of said circuits oscillatory current having a frequency differing by the same amount from each of said frequencies, and an indicating device differentially connected to said impressing means and responsive to the beats produced by one of the first-named frequencies with the last-named frequency but substantially unresponsive to beats produced by both of the first-named frequencies therewith.

8. Apparatus for receiving energy having the form of oscillations periodically modulated by variations of lower frequency, comprising a receiving element tuned to the frequency of said oscillations, means for producing current of said lower frequency from said energy, a resonant channel cooperating with said means to transmit only currents of the periodic modulating frequency, a second channel cooperating with said means to transmit only currents of a frequency differing slightly from the periodic modulating frequency, an indicating device, and means including a pair of detectors arranged in a push-pull circuit for differentially transmitting current derived from said channels to the indicating device.

9. Apparatus for receiving energy having the form of oscillations periodically modulated by variations of lower frequency, comprising a receiving element positioned to intercept the energy, a detector for producing current of said lower frequency from said energy, a resonant channel cooperating therewith to transmit only currents of the periodic modulating frequency, a second channel cooperating with the receiving element to transmit only currents of a frequency differing slightly from the periodic modulating frequency, an indicating device, and means for converting said currents to currents of lower, audible frequency and for differentially transmitting the last-mentioned currents to the indicating device, said means including a pair of vacuum tube detectors arranged in a push-pull circuit, a local source of electromotive force coupled with the input sides of said detectors and opposed couplings between the output sides of the detectors and the indicating device.

10. The method of receiving high frequency energy with neutralization of static which consists in tuning a receiving circuit to a frequency characteristic of the high frequency energy, tuning a second receiving circuit to a different frequency so as to cause static to set up energies of said different frequencies in the receiving circuits, heterodyning the energies produced in said circuits with the use of a local source of oscillatory electro-motive force having a frequency differing by the same amount from each of the first-mentioned frequencies, and causing signal energy induced in one of said circuits to produce an indication and equal energies induced in the circuits by static not to produce an indication.

11. The method of receiving high frequency waves periodically modulated by variations of lower, super-audible frequency which consists in detecting the waves to produce current of the frequency of the variations, tuning a receiving circuit to said frequency, tuning a second receiving circuit to a different frequency so as to cause static to set up currents of said different frequencies in the receiving circuits, heterodyning said currents with the use of a local source of oscillatory electro-motive force having a frequency differing by the same amount from each of the first-mentioned frequencies, and causing signal energy induced in one of the first-mentioned circuits to produce an indication and equal energies induced in the circuits by static not to produce an indication.

In testimony whereof I hereunto affix my signature.

EMERY LEON CHAFFEE.